Patented Jan. 30, 1945

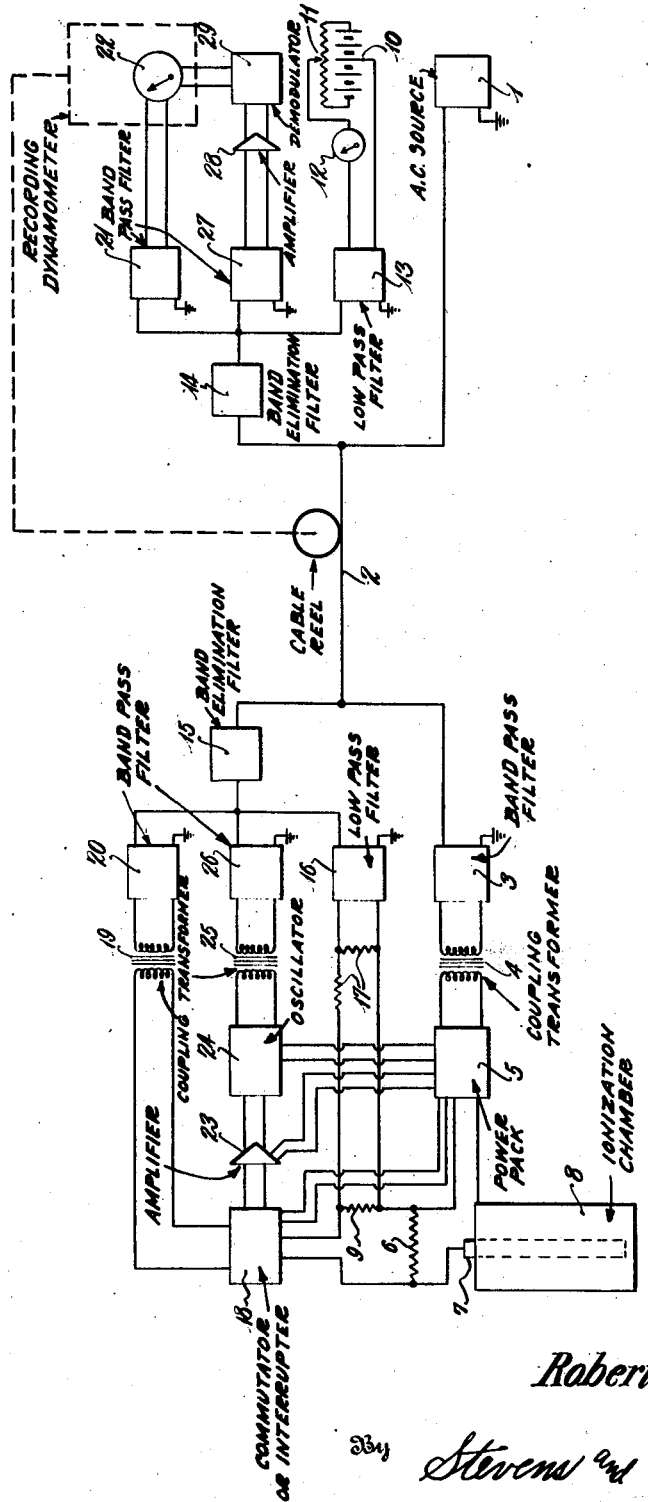

2,368,532

UNITED STATES PATENT OFFICE 2,368,532

WELL SURVEY METHOD AND APPARATUS

Robert Earl Fearon, Tulsa, Okla., assignor to Well Surveys, Incorporated, Tulsa, Okla., a corporation of Delaware Application December 27, 1939, Serial No. 311,219

11 Claims. (Cl. 250—83.6)

This invention relates to the art of geophysical prospecting and particularly to the measuring of the characteristics of the geological formations that surround, at various levels, drill holes or other deep, narrow openings in the ground. Especially is this invention concerned with a method and means whereby power may be transmitted to the measuring instrument in the hole and the results of the measurement returned to the surface to a recorder located there.

Previous to this invention it has been necessary either to lower into the hole with the measuring instrument all of the power supplying equipment necessary to operate the instrument and all of the recording equipment necessary to record its findings or provide numerous heavily insulated conductors extending from the instrument in the hole to the surface of the ground. The provision of a multi-conductor cable sufficiently well insulated and armored to withstand the extremely high pressures and the rough mechanical usage encountered, and at the same time preserve the conductors in a high state of insulation, has been a very serious problem in this field. Great lengths of cable must be lowered into a well in order to reach the levels it is desired to explore and it is extremely difficult to make a cable that will withstand the pressures and the fluids encountered at these levels.

Batteries can be lowered with the instrument to provide a source of power but it is difficult to provide a satisfactory recorder and arrange it in such a way that it can be lowered with the instrument and a record obtained of the measurements satisfactorily correlated with indications of the depths at which they were taken. Even the lowering of batteries with the instrument is unsatisfactory because it eliminates any outside control of the instrument and makes the instrument quite heavy and hard to handle. Further, the larger the instrument and its accessories, the larger must be the casing or capsule which contains it and this engenders mechanical difficulties including trouble in sealing the instrument tightly against the high pressure fluids that will be encountered and difficulties in raising and lowering the capsule in the well.

The present invention eliminates many of the difficulties heretofore experienced by providing a system that includes a measuring instrument that is lowered into the well on a single conductor cable and yet which is supplied with power through this cable and which uses the cable to transmit the results to the recording device on the surface.

In its preferred form, the present invention is a device for measuring, by the use of an ionization chamber, the radioactivity encountered at various levels in a drill hole and includes in the capsule or casing with the measuring instrument all of the mechanism necessary to make a "null" type of measurment of the intensity of the radiations except for the power supply and the recorder. These are located on the surface instead of in the well.

In order to get the main supply of power to the device an alternating current power source is connected to the cable which supports the capsule in the well on one side and grounded on the other. At its lower end this cable is connected through a suitable filter which passes only current of the right frequency and through a power pack arrangement such as is commonly used in radios, to the units which must be powered.

The only place where power is needed that is not supplied from this main power pack is a resistor across which a voltage drop is developed to balance that caused in a primary resistor by the flow of the ionization chamber current. The current for this balancing resistor is sent from the surface through the same wire as the main operating power by passing it first to a very low frequency filter that will allow the balancing current to pass but will not allow currents of higher frequency to pass, then through a band elimination filter which specifically prevents entry into the balancing current supply system of the current of the frequency used in the main power supply, and then into the supporting line. At the chamber or capsule the resistor current is taken from the main line through a band elimination filter which blocks out the current of the main power supply, passed through a filter which blocks all but very low frenquencies and finally applied to the balancing resistor.

Any voltage difference between the voltages of the primary and balancing resistors is applied to a communtator or interrupter driven from the power pack and the interrupted current is then passed to an amplifier also powered from the power pack and finally to a generator of carrier waves where it serves to modulate the carrier waves, preferably by a frequency type of modulation so that attenuation will not affect the accurate transmission of the indication. The carrier wave generator is also powered from the power pack.

The modulated carrier wave passes through a transformer and a band pass filter, which passes only waves of a frequency approximately that of the carrier, to the band elimination filter which blocks out the current intended for the power pack and through this filter into the main supporting cable. At the upper end of the shaft this modulated carrier current passes through the band elimination filter at that end, which has already been mentioned as blocking the main power current out of the remainder of the circuit, from this filter through a band pass filter similar to the one in the capsule, to an amplifier and finally to one coil of a double coil galvanometer or dynamometer.

The commutator in the capsule is also arranged so as to produce at the same time a second current, which current is of relatively constant amplitude but of a frequency indicative of the frequency of operation of the commutator. This current passes through a transformer, a band pass filter passing only that general frequency and the band elimination filter, which blocks out the power current, into the main line. At the upper end of the line this same current, which may be called a phasing current, passes through the band elimination filter at that end and through its particular band pass filter and to the other coil of the galvanometer or dynamometer. With the two currents mentioned acting on the dynamometer there is immediately an indication of the existence and direction of any unbalance between the primary resistor and the balancing resistor in the well and this difference can be adjusted to zero by adjusting the amount of current that is sent down to the balancing resistor. The current sent to the balancing resistor is then a measure of the intensity of the radiations in the well. All of this balancing can be automatically controlled at the upper end of the well by a device known as a "Micromax" which device is described in U. S. patents, Nos. 1,578,279; 1,934,882; and 1,935,732.

In order that a better understanding may be had of the details of the preferred form of the device constructed according to the principles of this invention, such a device is shown in detail in the accompanying drawing and described in detail hereafter. However, it is to be understood that the principles of this invention may be applied to the making of measurements other than those of radioactivity and by systems other than a "null" system such as here described.

In the drawing the device illustrated is one which is particularly useful for the purpose of exploring oil wells to determine the radioactivity of the formations surrounding the well at various levels. Those circuit elements shown in the lower part of the drawing are all contained within the chamber or capsule which is lowered into the well while all of the remaining elements, those shown at the top of the drawing, are located on the surface of the ground.

In operation, alternating current is supplied from a source 1 to ground and to the cable 2 which supports the capsule in the well. This current is preferably at around 800 cycles frequency and around 60 volts potential. When this current reaches the capsule it is taken from the supporting cable and from ground and passed through a band pass filter 3 which passes only current of around 800 cycles. From the band pass filter it goes through a coupling transformer 4 and to a power pack 5. This power pack supplies power to a number of circuit elements which will later be described.

Primarily, the power pack supplies a potential through a primary resistor 6 to the elements 7 and 8 of an ionization chamber. With this potential applied across the elements of the ionization chamber a current flows in the chamber proportional to the intensity of the radioactive radiations that impinge upon it. This current in turn developes a voltage drop across the resistor 6 also proportional to the intensity of the radiations.

In series with the resistance 6 is a balancing resistor 9 which, when supplied with the proper amount of current, will have a voltage drop exactly balancing the one across the primary resistor 6. In order to supply this current to the balancing resistor 9 an adjustable source of current is provided at the surface. This is shown in the drawing as a battery 10 with a potentiometer 11 connected thereacross and an ammeter 12 in series therewith.

Current from this system is passed through a low pass filter 13 which will pass only a steady or very low frequency current, for example, 3 cycles or less and from this filter to ground and through a band elimination filter 14 to the main supporting cable 2. The band elimination filter is designed specifically to eliminate currents of the frequency used for the main power supply, in the present case, current of around 800 cycles frequency.

As the balancing current reaches the capsule or container in the well it is taken from the supporting line through a band elimination filter 15 similar to the one at the surface, namely one which blocks out the 800 cycles current used for the power supply and then through a low pass filter 16 which will pass only a steady or very low frequency alternating current to the balancing resistor 9. Decoupling resistors 17 are placed across the output of the low pass filter 16 and in series with the balancing resistor 9 to effect a general decoupling of the balancing resistor 9 from the remainder of the circuit.

Connected in series with the two resistances 6 and 9 is a commutator or periodic interrupter 18 driven from the power pack and operating to produce two pulsating currents, one of relatively steady amplitude and with a frequency corresponding to the speed of the commutator and the other with the same frequency but with an amplitude depending upon the potential difference, if any, between the primary and balancing resistors 6 and 9.

The constant amplitude current is passed through a transformer 19 to a band pass filter 20 which passes only currents of approximately the frequency that will be generated by the commutator, in the present case about 70 cycles. From this filter the current passes on one side to the ground and the other side through the band elimination filter 15 which blocks out the power supply current, then through the main supporting cable 2 to the surface where it again passes through a band elimination filter 14, already mentioned, which blocks out the 800 cycle power supply current, then through a band pass filter 21 which passes only current of around 70 cycles and finally to one of the coils of a double coiled galvanometer or dynamometer 22.

The pulsating current from the commutator 18 that corresponds in amplitude to any difference in potential between the two resistors is passed to an amplifier 23 and then to an oscillator 24 where it acts to modulate an alternating current generated thereto and of a frequency such that it will act as a carrier wave. From the oscillator 24 the modulated carrier wave is passed through a coupling transformer 25 to a band pass filter 26 which will pass only alternating currents with a frequency in the neighborhood of that of the carrier wave, in the present case about 245 cycles. From this filter the current passes on the one hand to the ground and on the other hand to the band elimination filter 15 already mentioned. From this filter the modulated carrier wave passes up the suspending cable 2 through the band elimination filter 14 at the surface and then through a band pass filter 27 which passes only waves of around the carrier wave frequency. After passing through this filter the current is amplified by an amplifier 28, demodulated by a demodulator 29 and passed to the other coil of the dynamometer or galvanometer 22.

With the circuit in operation and in balance there will be no voltage difference resulting from the combination of the primary resistor 6 and the balancing resistor 9 and hence no current through the amplifier 23 and none from the demodulator 29 to the dynamometer or galvanometer. Under these circumstances one of the coils will be dead and there will be no movement in the dynamometer or galvanometer 22 and the needle will merely rest in the neutral position. However, if the intensity of the radiations impinging upon the ionization chamber change then the current flow in the primary resistor 6 will also change and a state of difference between the voltages across the primary and balancing resistors 6 and 9 will temporarily exist. This change may be either in one direction or the other depending upon whether the intensity of the radiations impinging upon the ionization chamber increase or decrease. In any event a current representing the difference will be transmitted to the amplifier 23 through the commutator 18 and its phase relation to the constant amplitude pulsating current produced by the commutator, will depend upon the direction of the potential difference between the resistors.

After passing through their respective circuits the constant amplitude alternating current and the alternating current representing the difference in potential will come together in the double coiled galvanometer or dynamometer. At this time the direction of the deflection will depend upon the phase relation of the two currents and hence a deflection in one direction will indicate a greater voltage drop across the balancing resistor than across the primary resistor and a deflection in the other direction will indicate the reverse condition. With this indication as a guide the potentiometer 11 may be adjusted to send more or less current through the balancing resistor 9 and thus bring the system back into balance. The new setting of the potentiometer 11 and the amperage indicated by the ammeter 12 will then indicate the intensity of the radiations.

The record of the measurements, in actual practice, will ordinarily be made automatically and the recorder will usually be driven by an electrical transmission from the cable as it enters and leaves the well so as to correlate the determinations with the depth at which they are made. The "Micromax" recorder already mentioned has been found satisfactory for performing the recording function and may be driven by a "Selsyn" electrical transmission system which drives it at a speed proportional to the speed at which the supporting cable enters or leaves the drill hole.

Other detailed changes in the system may also be made without departing from the spirit of this invention. For example, the frequencies used may be rearranged to suit particular circumstances, other characteristics than radioactivity may be measured, a direct recording system may be substituted for the "null" system, or the "null" system may be used without converting the indications into pulsating currents.

I claim:

1. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and with at least one source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and utilizing it as power to operate the measuring device, means at the measuring device for impressing upon the surrounding earth and the supporting cable through filters that will exclude the main power supply current and each other, at least two alternating electrical currents of different frequencies, the phase relation and relative magnitude of certain components of said alternating currents being indicative of the state of said measuring instrument, means at the surface end of the cable for removing said indicating currents through similar filters and means for recording the measurement made by the instrument as indicated by the said indicating currents.

2. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and with a source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and utilizing it as power to operate the measuring device, means also at the upper end of the cable for supplying a balancing current to bring the measuring device to a state of balance during each measurement, said means being connected to the cable and ground at the upper end of the cable, through a filter that will exclude the main power supply current and other unwanted currents, means at the measuring instrument for removing said balancing current from said cable and ground and applying it to said measuring device, said means including a similar filter, means at the measuring device for impressing upon the cable and ground at least two alternating electrical currents of different frequencies, the phase relation and relative magnitude of certain components of said alternating currents being indicative of the state of balance of said measuring device, means at the surface end of the cable for removing said indicating currents through similar filters, means for comparing said components, means for adjusting the balancing current by reference to said comparison to bring the instrument to a state of balance and means to record the amount of current necessary to establish balance.

3. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and with a source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and utilizing it as power to operate the measuring device, means also at the upper end of the cable for supplying a balancing current to bring the measuring device to a state of balance during each measurement, said means being connected to the cable and ground at the upper end of the cable, through a filter that will exclude the main power supply current and other unwanted currents, means at the measuring instrument for removing said balancing current from said cable and ground and applying it to said measuring device, said means including a similar filter, means at the measuring device for impressing upon the cable and ground at least two alternating electrical currents of different frequencies, the phase relation and relative magnitude of certain components of said alternating currents being indicative of the state of balance of said measuring device, means at the surface end of the cable for removing said indicating currents through similar filters, means for comparing said components, means for adjusting the balancing current by reference to said comparison to bring the instrument to a state of balance, means to record the amount of current necessary to establish balance and means operated in accordance with the movement of said cable to correlate the record of current with a record of the depth at which the measuring instrument is operating.

4. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and at least one source of power also positioned on the surface, a cable connected to the measuring instrument and extending to the surface to support the measuring instrument and form an electrical connection thereto, a source of alternating electrical current connected to said cable and the ground at the upper end of the cable, means at the measuring device connected between the ground and the lower end of the cable for receiving said current and utilizing it as power to operate the measuring device, means at the measuring device for impressing upon the surrounding earth and the supporting cable through filters that will exclude the main power supply current and each other, at least two alternating electrical currents of frequencies different from each other and different from that of the power supply, one of said currents being modulated and the other being constant so that the phase relation and relative magnitude of certain components of said impressed alternating currents being indicative of the state of said measuring instrument, means at the surface end of the cable for removing said indicating currents through similar filters and means for recording the indicated measurement.

5. In a device for geophysical exploration in which an instrument comprising an ionization chamber in series with a primary fixed resistance is lowered into an opening in the earth to measure characteristics of the surrounding strata and a recorder is positioned at the surface to record the measurements, the improvement which comprises as means to connect the measuring instrument with the recorder and with a source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and converting it into power to operate the measuring device including, primarily, a constant electrical potential for said said ionization chamber circuit, means also at the upper end of the cable for supplying a balancing current to bring the measuring device to a state of balance during each measurement, said means being connected to the cable and ground at the upper end of the cable through a filter that will exclude the main power supply current and other unwanted currents, means at the measuring instrument including a similar filter, for removing said balancing current from said cable and ground and applying it to a balancing resistor connected at one end to the resistor in the ionization chamber circuit so that the voltage developed across the two resistors will be the difference between the voltage developed by the ionization chamber current in the primary resistor and that developed by the balancing current in the balancing resistor, commutator means driven by current from the power supply means for generating a constant amplitude, constant frequency alternating phasing current and at the same time converting any voltage difference developed across the balancing and primary resistors into an altertnating indicating current of the same frequency as the phasing current but with an amplitude and phase relation to the phasing current that depends upon the magnitude and direction of said voltage difference, means at the measuring device powered by said power supply means for impressing upon the cable and ground one of said alternating currents, said means including a filter which excludes currents of other frequencies, means powered by said power supply means for generating and impressing on the ground and cable a carrier current of a different frequency from said alternating currents but modulated by the other alternating current, said means including a filter which excludes frequencies other than that of the carrier current, means at the surface end of the cable for removing and separating the phasing and indicating currents through filters similar to those through which they entered the cable, means for comparing said phasing and indicating currents, means for adjusting the balancing current by reference to said comparison to bring the instrument to a state of balance and means to record the amount of current necessary to establish balance.

6. In a device for geophysical exploration in which an instrument is lowered into an opening in the earth to measure characteristics of, surrounding strata and a recorder is positioned at the surface to record the measurements, the improvement which comprises as means to connect the measuring instrument with the recorder and with at least one source of power also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and utilizing it as power to operate the measuring device, means at the measuring device for impressing upon the surrounding earth and the supporting cable at least two alternating electrical currents of different frequencies, the phase relation and relative magnitude of certain components of said alternating currents being indicative of the state of said measuring instrument, means at the surface end of the cable for removing said indicating currents through filters that will exclude the main power supply current and segregate said currents, and means for recording the measurement made by the instrument as indicated by the said indicating currents.

7. In a device for geophysical exploration in which an instrument is lowered into an opening in the earth to measure characteristics of the surrounding strata and a recorder is positioned at the surface to record the measurements, the improvement which comprises as means to connect the measuring instrument with the recorder and at least one source of power also positioned on the surface, a cable connected to the measuring instrument and extending to the surface to support the measuring instrument and form an electrical connection thereto, a source of alternating electrical current connected to said cable and the ground at the upper end of the cable, means at the measuring device connected between the ground and the lower end of the cable for receiving said current and utilizing it as power to operate the measuring device, means at the measuring device for impressing upon the surrounding earth and the supporting cable at least two alternating electrical currents of frequencies different from each other and different from that of the power supply, one of said currents being modulated and the other being constant so that the phase relation and relative magnitude of certain components of said impressed alternating current are indicative of the state of said measuring instrument, means at the surface end of the cable for removing said indicating current through filters that will exclude the main power supply current and segregate the currents, and means for recording the indicated measurement.

8. In a device for geophysical exploration in which an instrument comprising an ionization chamber in series with a primary fixed resistance is lowered into an opening in the earth to measure characteristics of the surrounding strata and a recorder is positioned at the surface to record the measurements, the improvement which comprises as means to connect the measuring instrument with the recorder and with a source of power, also positioned on the surface, a cable connected to the measuring instrument and extending to the surface to support the measuring instrument and form an electrical connection thereto, a source of electrical current connected to said cable and the ground at the upper end of the cable, means at the measuring device connected between the ground and the lower end of the cable for receiving said current and converting it into power to operate the measuring device, including, primarily, a constant electrical potential for said ionization chamber circuit, means also at the upper end of the cable for supplying a balancing current to bring the measuring device to a state of balance during the measurement, said means being connected to the cable and ground at the upper end of the cable, means at the measuring instrument including a filter that will exclude the main power supply current and other unwanted currents, for removing said balancing current from said cable and ground and applying it to a balancing resistor connected at one end to the resistor in the ionization chamber circuit so that the voltage developed across the two resistors will be the difference between the voltages developed by the ionization chamber current in the primary resistor and that developed by the balancing current in the balancing resistor, commutator means driven by current from the power supply means for generating a constant amplitude, constant frequency, alternating phasing current and at the same time converting any voltage difference developed across the balancing and primary resistors into an alternating, indicating current of the same frequency as the phasing current but with an amplitude and phase relation to the phasing current that depends upon the magnitude and direction of said voltage difference, means at the measuring device powered by said power supply means for impressing upon the cable and ground one of said alternating currents, said means including a filter which excludes currents of other frequencies, means powered by said power supply means for generating and impressing on the ground and cable a carrier current of a different frequency from said alternating currents, but modulated by the other alternating current, said means including a filter which excludes frequencies other than that of the carrier current, means at the surface end of the cable for removing and separating the phasing and indicating currents through filters that exclude the power supply current and other unwanted currents, means for comparing said phasing and indicating currents, means for adjusting the balancing current by reference to said comparison to bring the instrument to a state of balance and means to record the amount of current necessary to establish balance.

9. In a device for geophysical exploration which includes a measuring instrument adapted to be lowered into a drill hole to measure phenomena indicative of the character of the surrounding strata, a recorder on the surface for recording said measurements and a supporting cable connected to the recorder and carrying the instrument, the improvements which comprise means at the measuring instrument for generating electrical oscillations, means for modulating the amplitude of said oscillations in accordance with the magnitude of the measurement being made, means to generate oscillations of a frequency different from the first-mentioned oscillations and of a constant amplitude, means to impress both of said oscillations upon the cable and the surrounding earth at the measuring instrument, means at the surface of the earth to detect and classify both of said oscillations, and means for recording at least one of said oscillations.

10. Method of geophysical exploration comprising suspending a sensitive signal-producing instrument upon an electrically conductive supporting cable; moving the suspended instrument within a well bore being explored; creating at least two alternating electrical currents of different frequencies in the cable and surrounding earth, the phase relation and relative magnitude of certain components of said alternating currents being related to signals produced by said instrument; receiving the current from the cable at the surface of the earth; segregating and classifying the component currents, and operating recording means controlled by said currents to produce a record of the signals transmitted by the sensitive instrument.

11. In a device for geophysical exploration which includes a measuring instrument adapted to be lowered into a drill hole to measure phenomena indicative of the character of the surrounding strata, a recorder on the surface for recording said measurements and a supporting cable connected to the recorder and carrying the instrument, the improvements which comprise means at the measuring instrument for generating electrical oscillations, means for modulating the amplitude of said oscillations in accordance with the magnitude of the measurement being made, means to generate oscillations of a frequency different from the first-mentioned oscillations and of a constant amplitude, means for combining and transmitting both of said oscillations to the surface of the earth, means at the surface of the earth to receive said combined oscillations, and means for actuating the recorder in accordance with the modulation of said first generated oscillations.

ROBERT EARL FEARON.